United States Patent [19]

Bauer

[11] Patent Number: 5,406,617
[45] Date of Patent: Apr. 11, 1995

[54] CORDLESS TELEPHONE/ENTRY INTERCOM SYSTEM

[76] Inventor: Ronald Bauer, 279 Cook St., Huntington Station, N.Y. 11746

[21] Appl. No.: 146,583

[22] Filed: Nov. 1, 1993

[51] Int. Cl.[6] .................. H04M 11/00; H04B 1/40
[52] U.S. Cl. ............................ 379/61; 379/38; 455/77
[58] Field of Search .............. 379/37, 38, 56, 58, 379/59, 61, 62, 63, 156, 159, 160, 167; 455/7, 77, 89, 347

[56] References Cited

U.S. PATENT DOCUMENTS

| | | | |
|---|---|---|---|
| 4,706,274 | 11/1987 | Baker et al. | 379/61 |
| 4,896,370 | 1/1990 | Kasparian | 455/77 |
| 5,237,602 | 8/1993 | Lazik | 379/38 |

Primary Examiner—Curtis Kuntz
Assistant Examiner—William Cumming
Attorney, Agent, or Firm—Kenneth P. Robinson

[57] ABSTRACT

An intercom capability is added to a basic radio telephone system by configuring the base station to function as a radio repeater for inter-active communication between a telephone/intercom handset and an intercom unit. A distinctive intercom ring signal permits a user to switch the handset to the intercom mode. Activation of the intercom receiver and transmitter on a timed basis limits battery drain. A purchaser, after setting up the base unit, need only position the intercom unit adjacent to a residence entry. Since no intercom wiring is required, the telephone/intercom is immediately ready for use with minimal installation. The base unit is also configured to prevent intercom access to or from the public telephone network.

13 Claims, 2 Drawing Sheets

CORDLESS TELEPHONE/ENTRY INTERCOM SYSTEM

This invention relates to telephone/intercom systems suited for residential use and, more particularly, to such systems having a radio telephone base station which, in addition to providing usual telephone service, includes the capability of functioning as a radio repeater for communication between an entry intercom unit and a telephone/intercom handset, while isolating the intercom unit from a public telephone network.

BACKGROUND OF THE INVENTION

Wireless radio telephones enable the telephone handset to be carried about the house so that telephone calls can be answered or initiated without the need to return to the point at which the base unit is connected to a public carrier network, such as the telephone company facilities. Thus, a homeowner can relax by the backyard pool and still use the telephone.

While many forms of entry intercom systems have been described, none are known to provide on an economical basis the ease of installation, reliability and over-all convenience of the cordless telephone. Such prior intercom systems are typically subject to difficulty in installation, limitations on portability, requirements for significant additional equipment, limited compatibility with existing telephone equipment, or other limitations and shortcomings.

It is therefore an object of this invention to provide integrated cordless telephone and entry intercom systems utilizing intercom, base and handset units designed to operate efficiently together with the portability, ease of operation and reliability of a cordless telephone system.

A further object is to provide such systems wherein the handset unit closely resembles existing cordless telephone handsets, the base unit relatively closely resembles existing cordless telephone base units with changes to permit operation as a radio repeater for intercom communication, and a relatively inexpensive intercom unit is arranged to be mounted near a residence entry without requiring signal or electrical wiring connections.

Further objects are to provide such systems utilizing base units providing a radio repeater function on an economical basis mainly employing components and capabilities already common in typical radio telephone base units, such systems which provide ease of installation and operation, and new and improved intercom/telephone systems which avoid one or more disadvantages of previously available systems.

SUMMARY OF THE INVENTION

In accordance with the invention, a cordless telephone and entry intercom system includes an intercom unit having a radio receiver, a radio transmitter, inquiry switch means for causing transmission of an inquiry signal and enclosure means for enabling the intercom unit to be mounted adjacent to a building entrance. The system also includes a telephone/intercom handset having a radio receiver, a radio transmitter and selection means for selecting between a telephone mode and an intercom mode, and a base unit including a radio receiver and a radio transmitter. The base unit also includes control means arranged for implementing the following functions (a) activating a telephone ring signal in response to an incoming telephone call,
(b) enabling interactive communication between the telephone/intercom handset and a public carrier network when the handset is in the telephone mode,
(c) causing an intercom ring signal, distinct from the telephone ring signal, to be sent to the handset in response to the inquiry signal from the intercom unit,
(d) configuring the base unit to operate as a radio repeater when the handset is in the intercom mode, so that voice signals are coupled between the base unit radio receiver and radio transmitter, and vice versa, to enable interactive communication between the handset and intercom unit, and
(e) isolating the intercom unit from communication with the public carrier network at all times.

Also in accordance with the invention, a cordless entry intercom unit includes a switch device, a radio receiver, radio transmitter means for transmitting an inquiry signal in response to activation of the switch device and for transmitting speech only when activated for speech transmission. The intercom unit also includes control means for activating the radio receiver for a predetermined time period after activation of the switch device, for activating the radio transmitter means for speech transmission in response to a speech signal received by the radio receiver, and for maintaining activation of the radio receiver and transmitter means on a timed bases in response to speech signals received by the radio receiver. As a result, the radio transmitter means, which is also fed by a microphone, is not activated for transmission of speech or background noise in the absence of its activation by the control means and power usage is limited by activation of the receiver and transmitter means on a controlled basis.

For a better understanding of the invention, together with other and further objects, reference is made to the following description taken in conjunction with the accompanying drawings and the scope of the invention will be pointed out in the accompanying claims.

BRIEF DESCRIPTION OF THE DRAWING

The drawings comprise a block diagram of an embodiment of a cordless telephone and entry intercom system in accordance with the invention.

DESCRIPTION OF THE INVENTION

Figure 1:
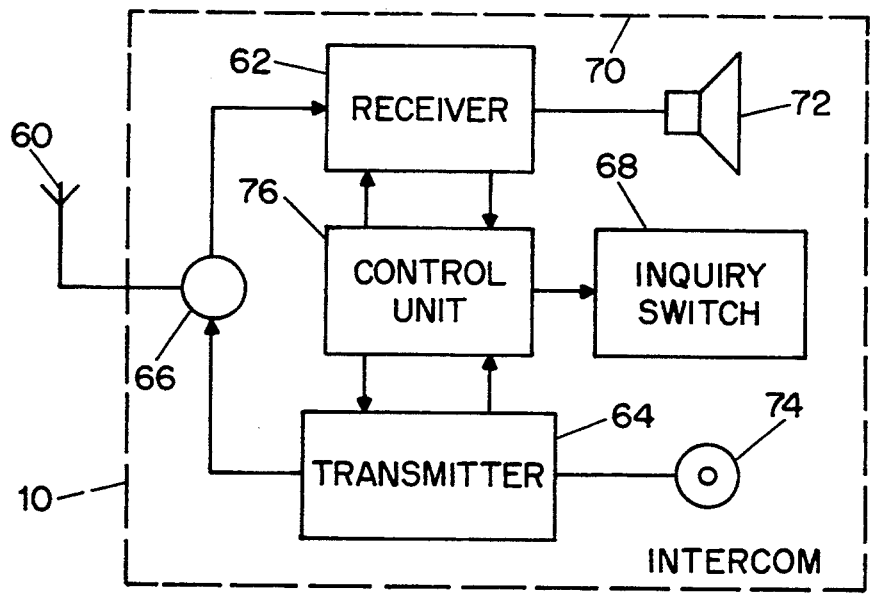
FIG. 1 shows an embodiment of the intercom unit of the system.
Figure 2:
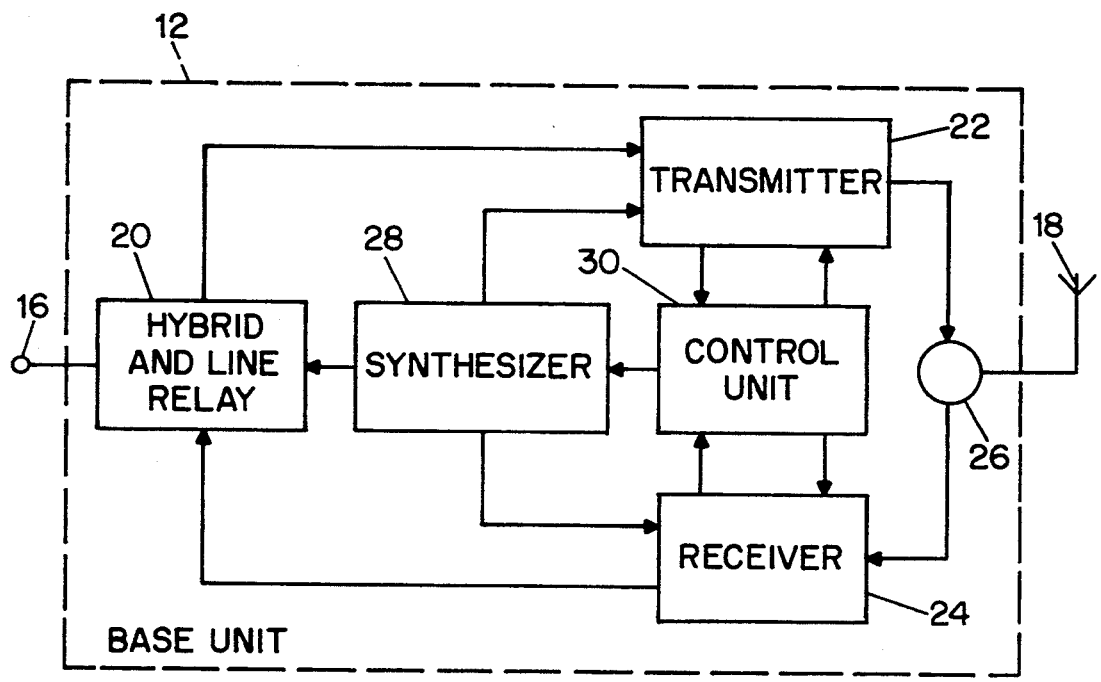
FIG. 2 shows an embodiment of the base unit of the system.
Figure 3:
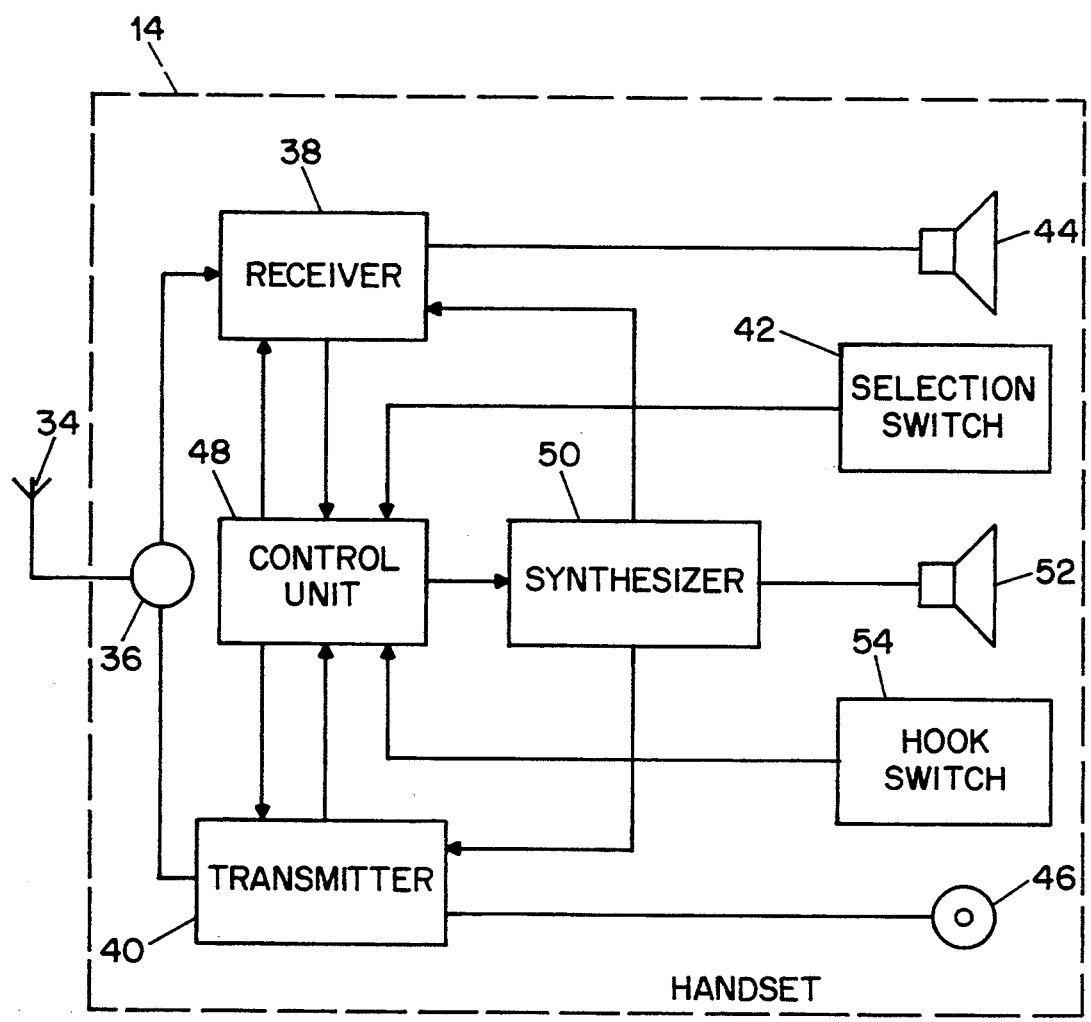
FIG. 3 shows an embodiment of the telephone/intercom handset portion of the system.

With reference to the drawings, there is shown an embodiment of a cordless telephone and entry intercom system in accordance with the invention. The system includes intercom unit 10, base unit 12 and telephone/intercom handset 14. Intercom unit 10 typically is positioned on the outside wall of a house adjacent the main entry door with no requirement for connection to the electrical or any other house wiring. Base unit 12 is positionable within the house at any location convenient for connection to a telephone jack wired for access to a public carrier network (e.g., the telephone company facilities). Handset 14 is left at a convenient location in the house or carried about the house and grounds, as desired.

Handset 14 and base unit 12 may have the basic form of any one of a variety of commercially available radio telephones. The invention will be described in the context of the illustrated units which illustrate the basic components of an appropriate radio telephone system modified for use of the invention. As shown, base unit 12 is connected to a wired telephone line (not shown) via terminal 16 and is effective to send and receive voice messages modulated on one or more radio channels, via antenna 18. In typical telephone mode operation, a signal received at terminal 16 from the telephone line is coupled, via line relay and hybrid circuit 20, to radio transmitter 22 for modulation onto a radio carrier and transmission in known manner via antenna 18. Conversely, a radio signal received from handset 14, via antenna 18, is coupled to radio receiver 24 by antenna duplexer 26, demodulated and then sent out over the telephone line via unit 20 and terminal 16. Synthesizer unit 28 is included for determining the operating radio frequencies of transmitter 22 and receiver 24. Control means, shown as control unit 30, is effective to provide the functions of controlling operation of the transmitter 22, receiver 24 and synthesizer 28 and can be readily implemented by persons skilled in the field once the desired functions and operation are described. The nature and operation of duplexer 26 and the hybrid circuit portion of unit 20 in coupling signals to and from transmitter 22 and 24 in desired manner are well known, as is the line relay portion of unit 20 which serves to connect or disconnect the base unit from the telephone line. Also as shown, handset 14 includes an antenna 34 for receiving and transmitting signals from and to base unit 12 and an associated antenna duplexer 36. Handset 14 further includes radio receiver 38, radio receiver 40, switch means (shown as selection switch 42) for selecting between a telephone operating mode and an intercom mode, and a hook switch 54 which operates in well-known manner to permit a user to activate the handset 14 or "hang up" when use is to be terminated. In typical telephone mode operation, an incoming telephone signal is coupled to receiver 38, via antenna 34 and duplexer 36, demodulated and reproduced as a voice message by speaker 44. A responsive voice message is input via microphone 46, modulated on a radio carrier in transmitter 40 and transmitted back to base unit 12, via antenna 36. Control unit 48 is effective to control operation of receiver 38, transmitter 40 and synthesizer unit 50. Synthesizer 50 determines the radio frequencies at which receiver 38 and transmitter 40 operate and also provides ring signals for conversion to audio by speaker 52, in response to control signals from unit 48. Thus, in the telephone mode, base unit 12 and 14 operate in a desired known manner to facilitate telephone communication and may include numerous additional components utilized in known manner.

Attention is now directed to intercom unit 10. As illustrated, the intercom unit includes an antenna 60 coupled to radio receiver 62 and radio transmitter 64 in known manner, via antenna duplexer 66. Also included in intercom unit 10 are switch means, shown as inquiry switch 68, for causing transmission of an inquiry signal and enclosure means, shown in outline as box 70, for enabling the intercom unit to be mounted in the vicinity of a building entrance (e.g., at the main entrance door, front gate, etc.). Enclosure 70 is constructed of plastic, metal, etc., in a manner suitable to provide a desired level of physical integrity and protection from environmental conditions. In practice, inquiry switch 68 may have the form of a push button, similar to a door bell button, or other device enabling easy activation by a person approaching the door and may be accompanied by an appropriate sign or label instructing activation of the device. Intercom 10, as shown, further includes speaker 72, microphone 74 and control unit 76 configured for controlling operation of receiver 62 and transmitter 62. In operation, radio signals received from base unit 12 on an appropriate channel are coupled to receiver 62, via antenna 60 and duplexer 66, and voice signals are reproduced by speaker 72. Conversely, voice signals input at microphone 74 are modulated on an appropriate channel in transmitter 64 and transmitted to the base unit 12 via duplexer 66 and antenna 60. Such reception and transmission of signals by intercom unit 10 is subject to the activation of receiver 62 or transmitter 64, or both, by control unit 76 in response to signals from inquiry switch 68 and base unit 12, as will be described further. Intercom unit 10 utilizes receiver, transmitter and other components similar to those commonly used in radio telephone units as described and control unit 76 and its desired operation can be readily implemented by skilled persons once having the benefit of description of the desired functions and operation.

The operation of the illustrated system in the telephone mode utilizes well-known principles and operative steps and need not be further described. In an overview, telephone calls may be placed and received by use of the handset 14 communicating via one or more radio channels with the base unit 12. In this way, the base unit provides for easy access to the telephone line by the handset. Considering now the operation of the system in the intercom mode, it will be seen that a principal difference is that whereas the handset 14 operates in a manner similar to its operation in the telephone mode, the base unit 12 operates in a significantly different manner in the intercom mode. Thus, in the telephone mode the base unit operates to couple voice signals to and from the telephone line, with the receiver 24 and transmitter 22 operating substantially independently and at different times. In contrast, in the intercom mode the base unit operates as a radio repeater, performing the basic function of merely receiving and retransmitting signals with substantially simultaneous operation of receiver 24 and transmitter 22, in a controlled manner. Other functions of base unit 12 and more detailed operation of the FIG. 1 system are included in the following description.

Operation of the illustrated system in the intercom mode is initiated by an individual approaching the front door to a residence, for example, and pressing the inquiry switch 68. In response to such activation of switch 68, control unit 76 activates transmitter 64 and causes it to transmit an inquiry signal to base unit 12. Such transmission may utilize a particular channel, signal coding, or other technique to enable the base unit to recognize the transmission of an incoming inquiry signal. In response to reception of the inquiry signal by the base unit 12, the signal is coupled to control unit 30, which causes an intercom ring signal, distinct from the telephone ring signal employed for telephone usage, to be transmitted to handset 14, via a transmitter 22. If a person in the vicinity of the location of handset 14 hears the ring signal, it will be recognizable as indicating an inquiry signal from a visitor standing at the front door. This follows because the distinct intercom ring signal is effective to distinguish from an incoming telephone call ring signal. The person hearing the intercom ring signal may then pick up the handset 14, placing hook switch 54 in the "off hook" position, and move selection switch 42 into its intercom mode position. Control unit 48, sensing that the hook switch 54 is in the "off hook" position and that selection switch 42 has been placed in the intercom mode position, causes transmitter 38 to send an intercom mode signal to base unit 12. Again, such transmission may utilize a particular channel, signal coding, or other technique to enable the base unit to recognize the transmission as an incoming intercom mode signal from the handset 14. Typically, such intercom mode signal will be closely followed by a voice message, such as "who's there?" or "may I help you?", intended for the individual standing at the front door. In response to the intercom mode signal, control unit 30 causes the base unit 12 to be configured for operation as a radio repeater, so that the voice message is received by receiver 24 and without significant delay is coupled to transmitter 22 and retransmitted via antenna for reception by intercom unit 10. Also, during intercom mode operation control unit isolates the intercom unit from communication with the public carrier network, for example by not activating the line relay function of unit 20, so that no connection to the telephone line is established.

In order for intercom unit 10 to receive a "who's there?" voice message its receiver must be activated. While receiver 62 may be kept in a turned-on state at all times for this purpose, it may be advantageous to arrange for control unit 76 to cause receiver 62 to be turned on for a predetermined period, on a timed basis, in response to the original activation of inquiry switch at the time the inquiry signal is transmitted, or to otherwise arrange for activation of receiver 62 on a battery saving basis. With receiver 62 activated, the "who's there?" voice message is received and demodulated and reproduced in speaker 72. In response to reception of the "who's there?" voice message in receiver 62, the control unit 76 may also be configured to activate transmitter 64. The visitor may then state his business, with the visitor's answer message picked up by microphone 74 or other suitable sound sensing device and coupled to transmitter 64 for transmission via antenna 60. With base unit 12 still configured to operate as a radio repeater, the answer message will be received in receiver 24 and quickly retransmitted by transmitter 22 for reception by handset 14. As a matter of design choice, receiver 24 and transmitter 22 may be configured to respectively provide and accept the voice messages to be retransmitted either in the form of demodulated voice signals, undemodulated radio signals or other forms as by be appropriate in particular applications.

Interactive intercom communication is thus enabled and may continue either until the communication ceases or the handset is switched to the telephone mode. If the individuals merely stop talking, the intercom unit may be returned to its inactive status and the base unit may be returned to its telephone mode by action of the respective control units 76 and 30 on a timed basis predetermined periods after the last voice signal is processed. Alternatively, the intercom may be deactivated in this or in a different appropriate manner and the base unit may remain in the intercom mode until the handset is switched to the telephone mode. With the handset and base unit in either the intercom mode or the telephone mode, the base unit and handset are still responsive to incoming telephone calls (by use of telephone ring signals) and intercom inquiry signals (by use of intercom ring signals) while the handset is not in active use. Call waiting and other known types of telephone operating options may also be provided. The selection switch 42 of the handset may thus remain in its last position until its position is changed by the user. Alternatively, a momentary or timed form of switch operation will permit activation of switch 42 for use of the intercom operation, with the handset automatically reverting to the telephone mode after completion of intercom communication.

Operation of the intercom unit 10 in the manner described above limits power use and battery consumption during periods of non-use and also prevents the microphone 74 from picking up background noise except during periods following affirmative activation by a handset user. In other arrangements the intercom receiver and transmitter may both be activated on a timed basis by control unit 76 following activation of inquiry switch 68, or the intercom unit may be arranged to be connected to an electrical outlet available near the entrance door. In the latter case the intercom unit may also be arranged to receive and transmit signals via signal transmission over the house electrical wiring in well-known manner in cooperation with a base unit also equipped for such communication over the electrical wiring system.

It will be appreciated that the basic embodiment described above makes practical the manufacture and sale of telephone/intercom systems necessitating little additional cost or complexity as compared to standard types of cordless telephones already on the market. Also, a purchaser of a telephone/intercom system utilizing the invention need only take the system home, set up the base unit in the usual manner and then simply position the intercom unit near the front door. Since the intercom unit requires no electrical or wiring connections, installation can be quick and simple, with immediate operation.

While there have been described what are presently considered to be the preferred embodiments of the invention, it is recognized that many variations, options and auxiliary features are already in use in radio telephones and it will be obvious to those skilled in the art that various changes and modifications may be made in application of the invention and it is, therefore, intended to cover all such changes and modifications as fall within the scope of the invention.

What is claimed is:

1. A cordless telephone and entry intercom system, comprising:
   an intercom unit including a radio receiver, a radio transmitter, inquiry switch means for causing transmission of an inquiry signal and enclosure means for enabling said intercom unit to be mounted adjacent to a building entrance;
   a telephone/intercom handset including a radio receiver, a radio transmitter and selection means for selecting between a telephone mode and an intercom mode; and
   a base unit including a radio receiver and a radio transmitter, said base unit further including control means arranged:
   (a) for activating a telephone ring signal in response to an incoming telephone call,
   (b) for enabling interactive communication between said telephone/intercom handset and a public carrier network when said handset is in said telephone mode, (c) for causing an intercom ring signal, distinct from said telephone ring signal, to be sent to said telephone/intercom handset in response to said inquiry signal from said intercom unit, (d) for configuring said base unit to operate as a radio repeater when said telephone/intercom handset is in said intercom mode, to cause voice signals to be coupled between said base unit radio receiver and base unit radio transmitter, and vice versa, to enable interactive communication between said handset and said intercom unit, and (e) for isolating said intercom unit from communication with said public carrier network at all times.

2. A cordless telephone and entry intercom system as in claim 1, wherein said intercom unit additionally includes control unit means, responsive to said inquiry switch means, for causing said intercom radio transmitter to transmit said inquiry signal after activation of said inquiry switch means and said base unit control means is responsive to said inquiry signal to cause said intercom ring signal to be transmitted to said telephone/intercom handset.

3. A cordless telephone and entry intercom system as in claim 1, wherein said inquiry switch means is a push-button switch and said intercom unit additionally includes control means, responsive to activation of said push-button switch, for causing said intercom radio transmitter to transmit said inquiry signal after activation of said push-button switch.

4. A cordless telephone and entry intercom system as in claim 1, wherein said base unit is configured to cause transmission of an intercom ring signal by said base unit radio transmitter in response to reception of said inquiry signal by said base unit radio receiver, and to cause retransmission of voice signals by said base unit radio transmitter when said telephone/intercom handset is in said intercom mode.

5. A cordless telephone and entry intercom system as in claim 1, wherein said intercom unit additionally includes control means for activating said intercom unit radio receiver on a timed basis only in response to a signal from one of the following, said base unit and said inquiry switch.

6. A cordless telephone and entry intercom system as in claim 1, wherein said intercom unit additionally includes control means for activating said radio receiver on a timed basis upon transmission of said inquiry signal and for activating said intercom unit radio transmitter on a timed basis in response to a signal received from said base unit.

7. A cordless telephone and entry intercom system as in claim 1, wherein said intercom unit additionally includes a microphone coupled to said intercom unit transmitter, a speaker coupled to said intercom receiver unit, and an antenna arranged for use in transmitting and receiving signals.

8. A cordless telephone and entry intercom system as in claim 1, wherein said base unit additionally includes an antenna coupled to said base unit radio receiver and radio transmitter via an antenna duplexer arranged to permit substantially simultaneous reception of a signal and retransmission of said signal.

9. A cordless telephone and entry intercom system as in claim 1, wherein said selection means of said radio telephone handset is a multi-position switch mounted on said handset.

10. A cordless telephone and entry intercom system as in claim 1, wherein said intercom unit is arranged for communication with said base unit utilizing a radio channel which is isolated from communication with said public carrier network.

11. A cordless telephone and intercom system, comprising:

an intercom unit including a switch device, radio transmitter means for transmitting an inquiry signal in response to activation of said switch device and for transmitting speech signals when activated by a control signal, radio receiver means for receiving speech signals when activated by a control signal, and control means coupled to said radio transmitter means and radio receiver means for providing control signals for activating said radio transmitter means and said radio receiver means on a timed basis;

a telephone/intercom handset including a radio receiver, a radio transmitter and selection means for selecting between a telephone mode and an intercom mode; and a base unit including a radio receiver and a radio transmitter, said base unit further including control means arranged:
  (a) for activating a telephone ring signal in response to an incoming telephone call,
  (b) for enabling interactive communication between said telephone/intercom handset and a public carrier network when said handset is in said telephone mode,
  (c) for causing an intercom ring signal, distinct from said telephone ring signal, to be sent to said telephone/intercom handset in response to said inquiry signal from said intercom unit,
  (d) for configuring said base unit to operate as a radio repeater when said telephone/intercom handset is in said intercom mode, to cause voice signals to be coupled between said base unit radio receiver and base unit radio transmitter, and vice versa, to enable interactive communication between said handset and said intercom unit, and
  (e) for isolating said intercom unit from communication with said public carrier network at all times.

12. A cordless telephone and intercom system as in claim 11, wherein said control means is arranged to activate said radio receiver means for speech signal reception for a predetermined time period after activation of said switch device, to activate said radio transmitter means for speech signal transmission in response to a speech signal received by said radio receiver means, and to maintain activation of said radio receiver means and radio transmitter means on a predetermined timed basis in response to speech signals received by said radio receiver means.

13. A cordless telephone and intercom system as in claim 11, wherein said intercom unit additionally includes a microphone coupled to said radio transmitter means, a speaker coupled to said radio receiver means and an antenna for receiving and transmitting signals.

* * * * *